(12) United States Patent
Hirose

(10) Patent No.: US 10,746,076 B2
(45) Date of Patent: Aug. 18, 2020

(54) PARTICULATE MATTER DETECTION CIRCUIT AND FILTER PROCESSING DEVICE

(71) Applicant: FUJITSU LIMITED, Kawasaki-shi, Kanagawa (JP)

(72) Inventor: Tatsuya Hirose, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 95 days.

(21) Appl. No.: 16/207,803

(22) Filed: Dec. 3, 2018

(65) Prior Publication Data
US 2019/0195111 A1 Jun. 27, 2019

(30) Foreign Application Priority Data
Dec. 21, 2017 (JP) ................. 2017-244794

(51) Int. Cl.
| | |
|---|---|
| *G01R 27/32* | (2006.01) |
| *F01N 3/00* | (2006.01) |
| *F01N 9/00* | (2006.01) |
| *F01N 3/023* | (2006.01) |
| *G01N 15/06* | (2006.01) |
| *B01D 46/44* | (2006.01) |
| *G01N 27/04* | (2006.01) |

(Continued)

(52) U.S. Cl.
CPC ........... *F01N 9/002* (2013.01); *B01D 46/444* (2013.01); *F01N 3/021* (2013.01); *F01N 3/023* (2013.01); *F01N 3/103* (2013.01); *F01N 9/00* (2013.01); *F01N 11/00* (2013.01); *G01N 15/0656* (2013.01); *G01N 27/043* (2013.01); *B01D 2273/18* (2013.01); *F01N 2560/05* (2013.01); *F01N 2560/12* (2013.01); *F01N 2560/14* (2013.01); *F01N 2900/1606* (2013.01); *G01N 2015/084* (2013.01)

(58) Field of Classification Search
CPC ........ G01N 27/043; G01N 9/00; G01N 9/002; F01N 3/021; F01N 3/023; F01N 3/028; F01N 3/103; B01D 46/46; B01D 46/444
See application file for complete search history.

(56) References Cited

U.S. PATENT DOCUMENTS

| | | | | |
|---|---|---|---|---|
| 5,497,099 A | * | 3/1996 | Walton | .................. B01D 46/46 324/639 |
| 9,062,576 B2 | * | 6/2015 | Snopko | ................... F01N 9/002 |

(Continued)

FOREIGN PATENT DOCUMENTS

| | | |
|---|---|---|
| JP | 2011-128002 | 6/2011 |
| WO | 2008/117869 | 10/2008 |
| WO | 2010/074812 | 7/2010 |

*Primary Examiner* — Minh N Tang
(74) *Attorney, Agent, or Firm* — Fujitsu Patent Center

(57) ABSTRACT

A particulate matter detection circuit includes, a negative resistance circuit that couples to a first antenna inserted in a housing accommodating a first filter that filters an exhaust gas, couples to a second antenna inserted in the housing via a matching circuit that performs an impedance matching and a second filter that narrows the frequency band of a passing signal, and oscillates at a resonance frequency of the housing, and a detection circuit that outputs a voltage value corresponding to a signal strength of a radio wave received by a third antenna or the second antenna inserted in the housing. The resonance frequency of the housing varies depending on an amount of matter adhered to the first filter.

7 Claims, 11 Drawing Sheets

(51) Int. Cl.
  *F01N 11/00* (2006.01)
  *F01N 3/10* (2006.01)
  *F01N 3/021* (2006.01)
  *G01N 15/08* (2006.01)

(56) References Cited

U.S. PATENT DOCUMENTS

| | | |
|---|---|---|
| 9,399,185 B2 | 7/2016 | Bromberg et al. |
| 10,118,119 B2 * | 11/2018 | Sappok .................. F01N 11/00 |
| 2009/0315569 A1 | 12/2009 | Katsuyama et al. |

* cited by examiner

PARTICULATE MATTER DETECTION CIRCUIT AND FILTER PROCESSING DEVICE

CROSS-REFERENCE TO RELATED APPLICATION

This application is based upon and claims the benefit of priority of the prior Japanese Patent Application No. 2017-244794, filed on Dec. 21, 2017, the entire contents of which are incorporated herein by reference.

FIELD

The embodiments discussed herein are related to a particulate matter detection circuit and a filter processing device.

BACKGROUND

An exhaust gas discharged from a diesel engine includes particulate matter (hereinafter, referred to as "PM"). The exhaust gas regulation for preventing the air pollution caused by the PM has become stricter each year. As a measure for meeting the regulation, a diesel vehicle is provided with a filter for filtering the exhaust gas in order to reduce an amount of pollutants to be discharged into the atmosphere. This filter is called DPF (Diesel Particulate Filter).

The PM adheres to the DPF and the amount of adhered PM increases in proportion to the travel distance of the diesel vehicle. When the amount of adhered PM increases, the discharge amount of exhaust gas decreases and the original performance of the diesel engine is not exhibited, which leads to deterioration of fuel economy. In addition, when the PM adheres to the DPF to the extent that the exhaust gas cannot be discharged completely, the DPF itself is damaged, which leads to not only an outflow of the unfiltered exhaust gas into the atmosphere but also a damage of the diesel engine itself.

In order to avoid such a situation, many diesel vehicles currently on the market have pressure sensors installed in the inlet side and the outlet side of the exhaust gas of the DPF, and the exhaust state of the DPF is monitored by measuring the pressure difference therebetween (differential pressure). However, in this monitoring method that utilizes the differential pressure, it has been known that the measurement may not be correctly performed since the monitoring is performed by mechanical mechanism which is susceptible to the influence of vibration of the engine or running.

In addition, when the PM (most of which contains carbon) adhered to the DPF is burned away using, for example, diesel oil, the amount of adhered PM (hereinafter, referred to as "PM accumulation amount") is unknown in the above method. Thus, it is difficult to estimate the amount of fuel required to remove the PM.

Thus, there has been proposed a method in which a radio wave of 0.4 GHz to 2.5 GHz is propagated into a metal housing equipped with the DPF and the PM accumulation amount is estimated by measuring the frequency characteristics of the S parameter at a resonance frequency (eigenvalue) determined by the size or the shape of the metal housing.

Related techniques are disclosed in, for example, International Publication Pamphlet No. WO 2010/074812, U.S. Pat. No. 9,399,185, and Japanese Laid-open Patent Publication No. 2011-128002.

SUMMARY

According to an aspect of the embodiments, a particulate matter detection circuit includes, a negative resistance circuit that couples to a first antenna inserted in a housing accommodating a first filter that filters an exhaust gas, couples to a second antenna inserted in the housing via a matching circuit that performs an impedance matching and a second filter that narrows the frequency band of a passing signal, and oscillates at a resonance frequency of the housing, and a detection circuit that outputs a voltage value corresponding to a signal strength of a radio wave received by a third antenna or the second antenna inserted in the housing. The resonance frequency of the housing varies depending on an amount of matter adhered to the first filter.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Since the Q value of the metal housing equipped with the DPF is large, the resolution becomes finer when the frequency is changed in order to measure the frequency characteristics of the S parameter at a specific resonance frequency, and the amount of data to be acquired increases. For this reason, there is a problem in that the time for data processing increases, and, as a result, the time for measuring the PM accumulation amount increases.

For example, the Q value of a system in which a DPF where the PM is not adhered is inserted in the metal housing is almost determined by the Q value of the DPF itself which exceeds 100,000. The Q value may be expressed by an equation of Q=f0/(f2−f1). The "f0" represents a resonance frequency, and the "f1" and "f2" (>f1) represent frequencies whose value is half of the value at f0 (resonance voltage or resonance current). When "f2−f1" is the half-value width and the resolution for matching the frequency to the resonance frequency with high precision is 1/1000 of the half-value width, assuming that f0=2.5 GHz and Q=100,000, the resolution becomes 25 Hz. In a range of 0.4 GHz to 2.5 GHz of the frequency of a radio wave propagated into the metal housing, when the resolution is changed and data on the above frequency characteristics is acquired, the data amount becomes a gigabyte (GB) class, which takes a lot of time to just acquire the data.

Hereinafter, embodiments for carrying out the present disclosure will be described with reference to the drawings.

First Embodiment

Figure 1A:
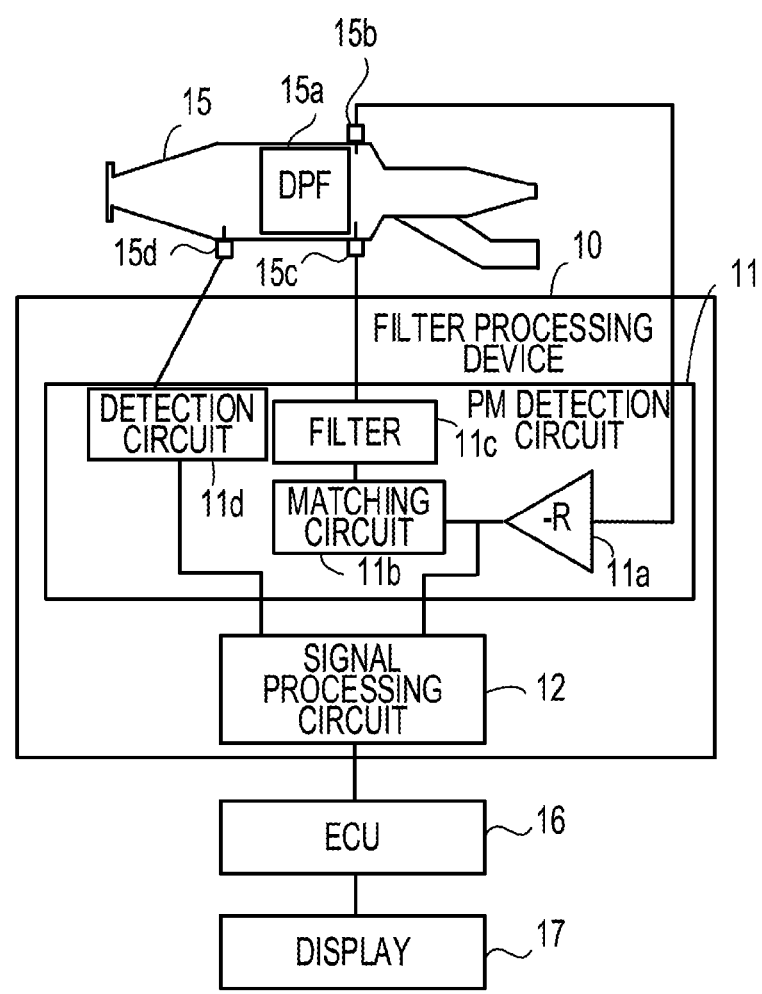
FIG. 1A is a view illustrating an example of a PM detection circuit and a filter processing device according to a first embodiment.

FIG. 1A is a view illustrating an example of a PM detection circuit and a filter processing device according to a first embodiment.

The filter processing device 10 includes a PM detection circuit 11 and a signal processing circuit 12. The PM detection circuit 11 includes a negative resistance element 11a, a matching circuit 11b, a filter 11c, and a detection circuit 11d.

The input terminal of the negative resistance element 11a is coupled to an antenna 15b inserted in a housing (metal housing) 15 that accommodates a DPF 15a that filters an exhaust gas, and the output terminal thereof is coupled to an antenna 15c inserted in the housing 15 via the matching circuit 11b and the filter 11c. When the housing 15 that functions as a resonance circuit is coupled to the input terminal, the negative resistance element 11a oscillates at the resonance frequency of the housing 15 which varies according to the amount of deposits such as PM or ash. The negative resistance element 11a is implemented by, for example, a transistor, a capacitor, or an inductor. As the negative resistance element 11a, for example, a tunnel diode or a Gunn diode may be used. An example of the negative resistance element 11a will be described later.

The matching circuit 11b is interposed, for example, between the output terminal of the negative resistance element 11a and the filter 11c, and performs an impedance matching for maximizing the output power of the negative resistance element 11a.

The filter 11c is interposed, for example, between the matching circuit 11b and the antenna 15c. The filter 11c is a band-pass filter that narrows the frequency band of a passing signal to a certain band. When the housing 15 has plural resonance frequencies which will be described later, the parameter of the filter 11c is adjusted so as to block the passage of signals in the bands other than a band including one of the plural resonance frequencies.

In addition, the filter 11c may be a circuit that is able to change the band which is allowed to pass through by the circuit, for example, based on a control by the signal processing circuit 12.

Further, the matching circuit 11b and the filter 11c may be coupled between the output terminal of the negative resistance element 11a and the antenna 15c in the opposite order to the example of FIG. 1A.

The detection circuit 11d outputs a voltage value corresponding to the signal strength of a radio wave received by an antenna 15d inserted in the housing 15. The detection circuit 11d is, for example, a diode detection circuit.

A filter having the same function as the filter 11c may be interposed between the antenna 15d and the detection circuit 11d. Further, the detection circuit 11d may output a voltage value corresponding to the signal strength of a radio wave received by the antenna 15c, instead of the antenna 15d.

The signal processing circuit 12 measures the voltage value of the output signal of the detection circuit 11d and the frequency of the output signal of the negative resistance element 11a, and collects and outputs the results of the measurement.

The collected measurement results are supplied to, for example, an ECU (Engine Control Unit) 16 as illustrated in FIG. 1A. The ECU 16 includes, for example, a CPU (Central Processing Unit) and controls the engine of a vehicle (not illustrated). For example, the ECU 16 may calculate the PM accumulation amount based on the collected measurement results and display the calculated PM accumulation amount on a display 17. The PM accumulation amount may be calculated by the signal processing circuit 12 of the filter processing device 10.

In the PM detection circuit 11 described above, signal reflection is repeated between the input terminal of the negative resistance element 11a and the antenna 15b, and due to the resonance phenomenon, the oscillation frequency of the negative resistance element 11a becomes equal to the resonance frequency of the housing 15.

Figure 1B:
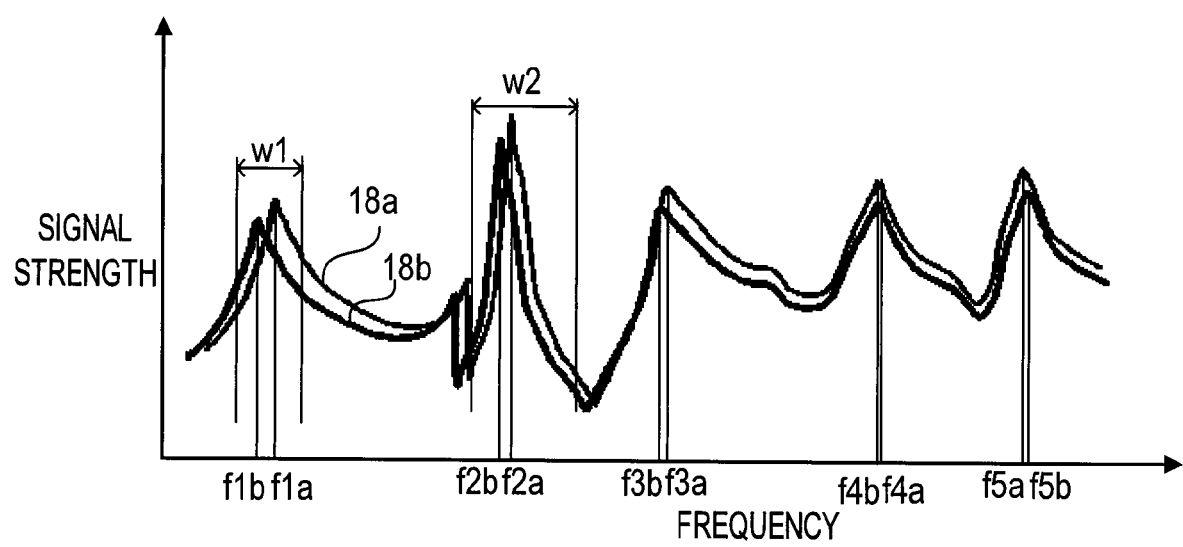
FIG. 1B is a view illustrating an example of the frequency characteristics of a radio wave propagating into a housing.

FIG. 1B illustrates an example of the frequency characteristics of a radio wave propagating into the housing 15. The horizontal axis represents a frequency and the vertical axis represents a signal strength. A waveform 18a represents the frequency characteristics of a radio wave when PM or ash is not adhered to the DPF 15a, and a waveform 18b represents the frequency characteristics of the radio wave when PM or ash is adhered to the DPF 15a.

As represented by the waveform 18a, the signal strength of the radio wave propagating into the housing 15 increases at the resonance frequencies f1a, f2a, f3a, f4a, and f5a according to the size or shape of the housing 15.

Meanwhile, when the PM or ash is adhered to the DPF 15a, the resonance frequencies f1a, f2a, f3a, f4a, and f5a are shifted to the resonance frequencies f1b, f2b, f3b, f4b, and f5b, respectively, as represented by the waveform 18b. This is because the dielectric constant in the housing 15 is changed by the adhered PM or ash.

Further, when the PM is adhered to the DPF 15a, the signal strength of the radio wave at the resonance frequencies f1b, f2b, f3b, f4b, and f5b is attenuated, as compared with a case when the PM is not adhered to the DPF 15a. This is because, when the radio wave as an alternating signal propagates in the housing 15, heat is generated due to the vibration of the PM having conductivity, resulting in a loss. The amount of attenuation at this time reflects the PM accumulation amount. The larger the amount of attenuation indicates the larger the PM accumulation amount.

The band allowed to pass through by the filter 11c differs depending on a resonance frequency at which the PM detection circuit 11 detects the PM accumulation amount from the change in signal strength. For example, when the PM detection circuit 11 detects the PM accumulation amount from the change in signal strength at the resonance frequency f1a, the filter 11c is used to narrow the frequency band of the output signal to a band w1. When the PM detection circuit 11 detects the PM accumulation amount from the change in signal strength at the resonance frequency f2a, the filter 11c is used to narrow the frequency band of the output signal to a band w2.

In addition, filters corresponding to the bands w1 and w2, respectively, may be provided, and the signal processing circuit 12 may switch between the filters for use. Further, as long as the filter 11c is capable of changing the band allowed to pass through by the filter 11c, for example, the filter 11c may switch the allowed band to the band w1 or the band w2 under the control of the signal processing circuit 12.

As described above, signal reflection is repeated between the input terminal of the negative resistance element 11a and the antenna 15b, and due to the resonance phenomenon, the oscillation frequency of the negative resistance element 11a becomes equal to the resonance frequency of the housing 15. For example, in a case where the filter 11c is used to narrow the frequency band of the output signal to the band w2, when the PM or ash is adhered to the DPF 15a so that the resonance frequency f2a is changed to the resonance frequency f2b, the oscillation frequency of the negative resistance element 11a also follows the change to become equal to the resonance frequency f2b.

As a result, a voltage value corresponding to the signal strength of the radio wave having the same frequency as the resonance frequency f2b is output from the detection circuit 11d. Then, for example, the ECU 16 calculates the PM accumulation amount based on a difference between the voltage value and a voltage value when the PM is not adhered (for example, corresponding to the difference between signal strength at the resonance frequency f2b and signal strength at the resonance frequency f2a in FIG. 1B). For example, the ECU 16 may hold in advance data indicating the relationship between the voltage value difference and the PM accumulation amount and determine the PM accumulation amount based on the data.

Further, the signal processing circuit 12 receives the output signal of the negative resistance element 11a and measures the frequency of the output signal. Then, upon receiving a result of the measurement, the ECU 16 detects a change in resonance frequency due to the PM or ash adhered to the DPF 15a.

According to the PM detection circuit 11 of the first embodiment described above, the negative resistance element 11a oscillates at the resonance frequency of the housing 15. That is, even without finely changing the oscillation frequency by connecting a resonance circuit that changes the resonance frequency by a voltage to the input terminal of the negative resistance element 11a, the oscillation frequency of the negative resistance element 11a follows the change in the resonance frequency according to the amount of adhered matter. Therefore, the amount of data to be acquired is reduced as compared with the case where the resonance frequency is detected by finely changing the oscillation frequency, thereby reducing the time required for data processing. As a result, the time for measuring the PM accumulation amount may be reduced. Further, the change in the accumulated amount of adhered matter may be sequentially monitored in real time.

Second Embodiment

Figure 2:
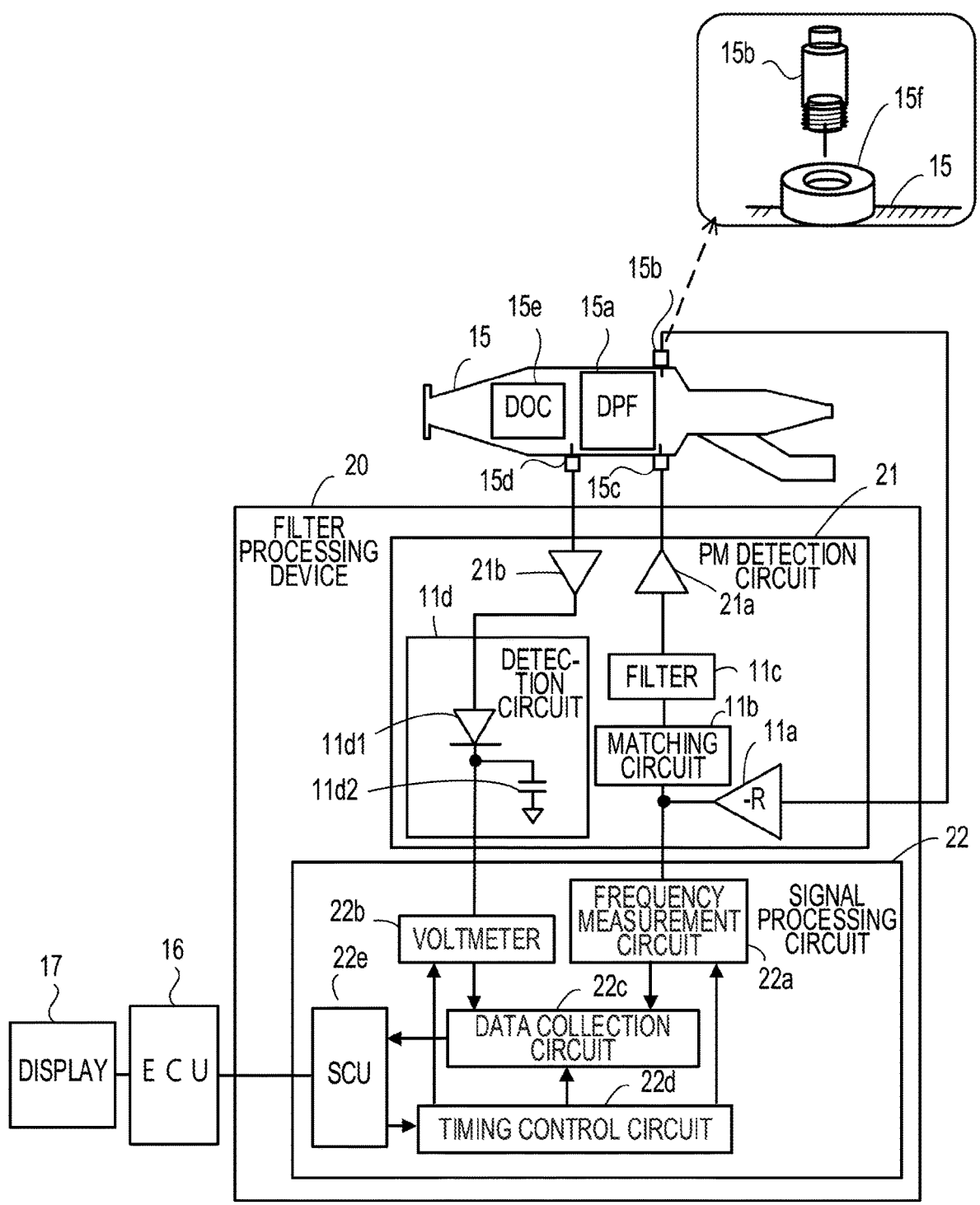
FIG. 2 is a view illustrating an example of a PM detection circuit and a filter processing device according to a second embodiment.

FIG. 2 is a view illustrating an example of a PM detection circuit and a filter processing device according to a second embodiment. In FIG. 2, the same components as those illustrated in FIG. 1A will be denoted by the same reference numerals as used in FIG. 1A.

In the example of FIG. 2, a DOC (Diesel Oxidation Catalyst) 15e is disposed at the inlet side of the exhaust gas in the housing 15, and the antenna 15d is interposed between the DOC 15e and the DPF 15a disposed at the outlet side of the exhaust gas. When burning the PM adhered to the DPF 15a, the DOC 15e promotes the burning by a catalytic action so that the PM burns at a relatively lower temperature.

The antennas 15b to 15d are attached to a boss (e.g., a boss 15f as illustrated in FIG. 2) disposed in the housing 15.

A PM detection circuit 21 of a filter processing device 20 has the same configuration as the PM detection circuit 11 illustrated in FIG. 1A, except that the PM detection circuit 21 of the second embodiment includes an amplification circuit 21a interposed between the filter 11c and the antenna 15c, and an amplification circuit 21b interposed between the detection circuit 11d and the antenna 15d. The amplification circuit 21a amplifies the output signal of the filter 11c and supplies the amplified signal to the antenna 15c. Further, the amplification circuit 21b amplifies a signal based on a radio wave received by the antenna 15 d and supplies the amplified signal to the detection circuit 11d.

FIG. 2 further illustrates an example of the detection circuit 11d. The detection circuit 11d includes a diode 11d1 and a capacitor 11d2. The anode of the diode 11d1 is coupled to the output terminal of the amplification circuit 21b, and the cathode of the diode 11d1 is coupled to a signal processing circuit 22. One end of the capacitor 11d2 is coupled to the cathode of the diode 11d1, and the other end of the capacitor 11d2 is grounded.

In addition, a filter having the same function as the filter 11c may be interposed between the amplification circuit 21b and the detection circuit 11d.

The signal processing circuit 22 includes a frequency measurement circuit 22a, a voltmeter 22b, a data collection circuit 22c, a timing control circuit 22d, and an SCU (Sensor Control Unit) 22e.

The frequency measurement circuit 22a measures the frequency of the output signal of the negative resistance element 11a.

The voltmeter 22b measures the voltage value of the output signal of the detection circuit 11d.

The data collection circuit 22c collects measurement results of the frequency measurement circuit 22a and the voltmeter 22b.

Under the control of the SCU 22e, the timing control circuit 22d outputs a trigger signal instructing the start and end of the operation of each of the frequency measurement circuit 22a, the voltmeter 22b, and the data collection circuit 22c.

The SCU 22e controls the timing control circuit 22d and also acquires the measurement results collected by the data collection circuit 22c, which are then transmitted to the ECU 16.

Figure 3:
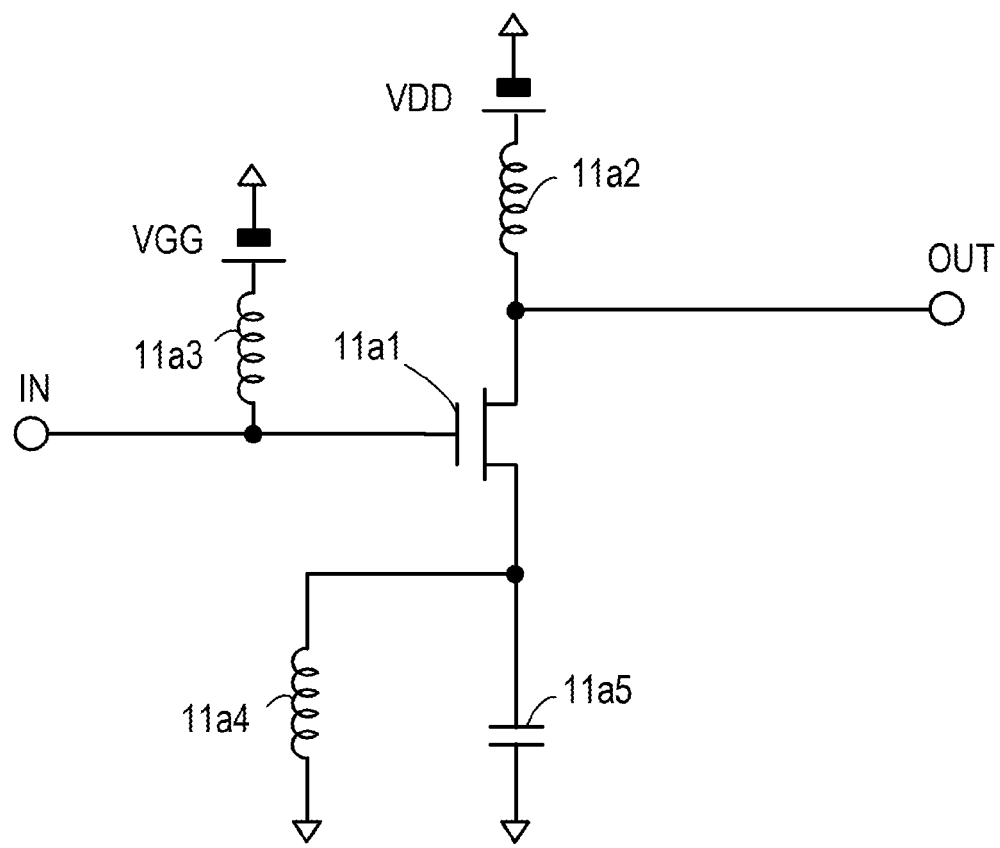
FIG. 3 is a view illustrating an example of a negative resistance element.

FIG. 3 is a view illustrating an example of a negative resistance element.

The negative resistance element 11a includes a transistor 11a1, inductors 11a2, 11a3, and 11a4, and a capacitor 11a5.

As illustrated in FIG. 3, the transistor 11a1 is, for example, an n-channel MOSFET (Metal-Oxide-Semiconductor Field-Effect Transistor). The drain of the transistor 11a1 is coupled to an output terminal OUT and is also coupled to a power supply VDD via the inductor 11a2. The gate of the transistor 11a1 is coupled to an input terminal IN and is also coupled to a power supply VGG via the inductor 11a3. The source of the transistor 11a1 is grounded via the capacitor 11a5 and is also grounded via the inductor 11a4.

The power supply VDD outputs a power supply voltage for making the transistor 11a1 active. The power supply voltage output by the power supply VDD determines a value of the signal amplitude of the output signal (oscillation signal) of the negative resistance element 11a.

A power supply voltage output by the power supply VGG is set so that the trans-conductance of the transistor 11a1 is maximized.

The inductors 11a2 to 11a4 function as choke coils, and the inductance values thereof are set so that a signal having a higher frequency than a signal with a frequency of about several MHz does not propagate to the power supplies VDD and VGG and the ground.

The capacitor 11a5 is provided to implement the positive feedback.

In such a negative resistance element 11a, the parameters of the inductors 11a2 to 11a4 and the capacitor 11a5 are adjusted so that the stability coefficient becomes less than 1 so as to continue the oscillation at a frequency used.

However, the oscillation conditions vary according to the PM accumulation amount in the housing 15.

Figure 4:
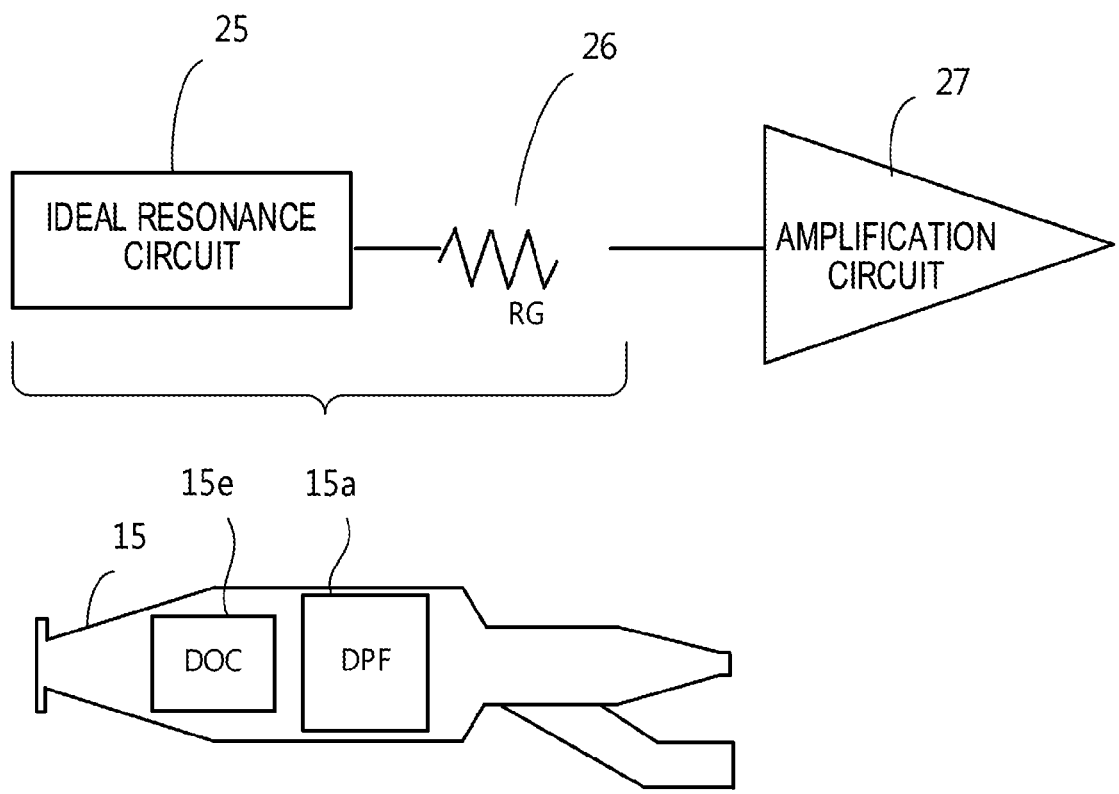
FIG. 4 is a view illustrating an example of an equivalent circuit of a housing.

FIG. 4 is a view illustrating an example of an equivalent circuit of the housing. In FIG. 4, in order to explain the oscillation conditions, an amplification circuit 27 is illustrated in place of the negative resistance element 11a.

The equivalent circuit of the housing 15 has an ideal resonance circuit 25 and a resistor 26 coupled in series to the ideal resonance circuit 25. The resistor 26 equivalently represents the PM accumulation amount. When the PM accumulation amount increases, the resistance value RG of the resistor 26 increases, and the output stable circle of the amplification circuit 27 changes as follows.

Figure 5:
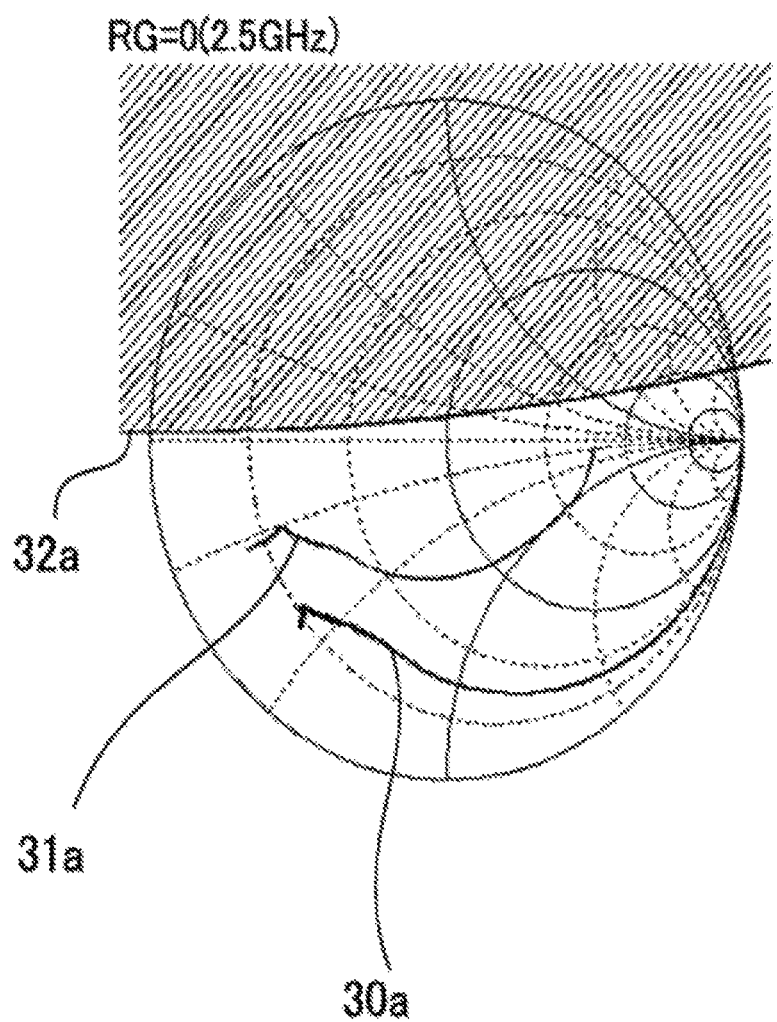
FIG. 5 is an example of a Smith chart representing a part of an output stable circle at RG=0 when a negative resistance element is oscillated at 2.5 GHz.

FIG. 5 illustrates an example of a Smith chart representing a part of an output stable circle at RG=0 when a negative resistance element is oscillated at 2.5 GHz.

Figure 6:
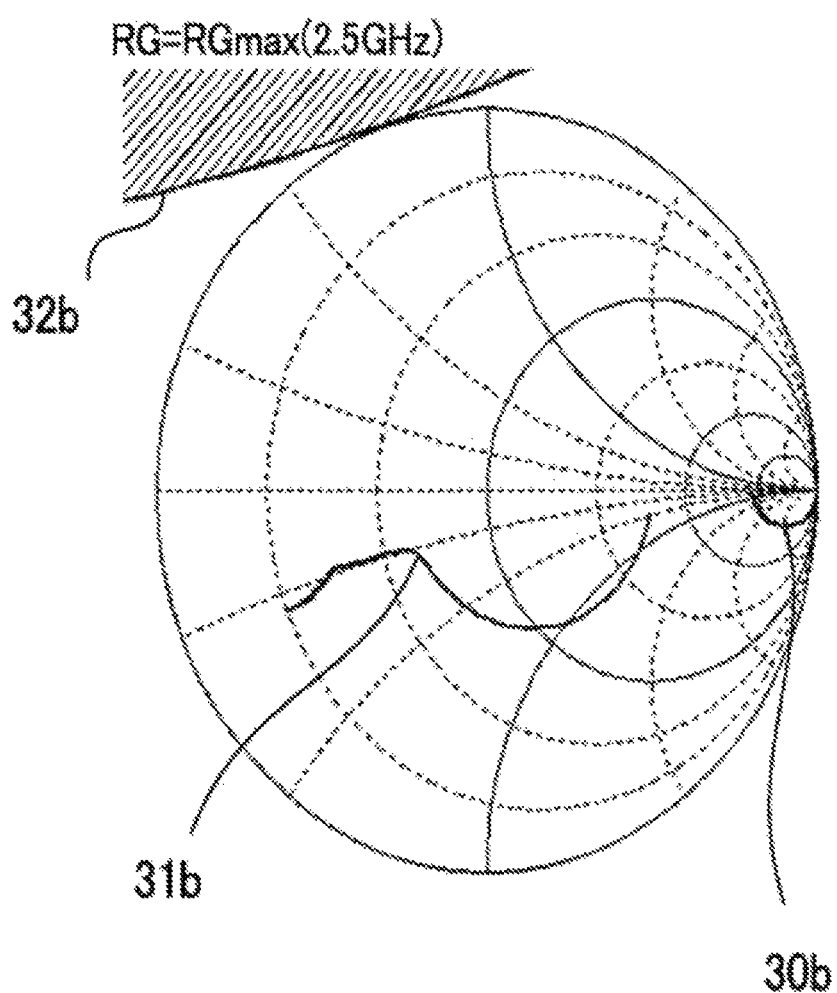
FIG. 6 is an example of a Smith chart representing a part of an output stable circle at RG=RGmax when a negative resistance element is oscillated at 2.5 GHz.

FIG. 6 illustrates an example of a Smith chart representing a part of an output stable circle at RG=RGmax when a negative resistance element is oscillated at 2.5 GHz.

Trajectories 30a and 30b are examples of trajectories of the S parameter ($S_{11}$) indicating the input reflection of the amplification circuit 27. Trajectories 31a and 31b are examples of trajectories of the S parameter ($S_{22}$) indicating the output reflection of the amplification circuit 27. Curves 32a and 32b indicate arcs of the output stable circle.

As illustrated in FIG. 5, when RG=0, that is, when there is no loss due to PM, the Smith chart overlaps with a part of the output stable circle. This overlapping region is an unstable region (where the stability coefficient is less than 1). By setting the impedance of this unstable region in the output terminal of the amplification circuit 27, the amplification circuit 27 oscillates so as to function as the negative resistance element 11a.

Meanwhile, as illustrated in FIG. 6, when the PM accumulation amount increases so that the resistance value RG reaches an arbitrary value (RGmax), the output stable circle no longer overlaps with the Smith chart. In this case, the amplification circuit 27 does not function as the negative resistance element 11a and stops the oscillation.

Based on such a change in the output stable circle, the impedance to be set in the output terminal of the amplification circuit 27 is determined so as to maintain the oscillation of the amplification circuit 27 as much as possible (so as to make the amplification circuit 27 function as the negative resistance element 11a) even when the PM accumulation amount increases.

For example, in order to maintain the oscillation as much as possible even when the PM accumulation amount increases, the impedance to be set in the output terminal of the amplification circuit 27 is determined to be the vicinity of the portion where the curve 32b in FIG. 6 and the Smith chart are in contact with each other. However, in order to oscillate the amplification circuit 27 at plural resonance frequencies as illustrated in FIG. 1B, the impedance may be set based on a change in the output stable circle at each resonance frequency.

The setting of the impedance is performed, for example, by selecting and applying the inductors 11a2 to 11a4 and the capacitor 11a5 illustrated in FIG. 3 having appropriate parameters.

The impedance of the matching circuit 11b for maximizing the output power of the negative resistance element 11a is determined by, for example, a method described below.

Figure 7:
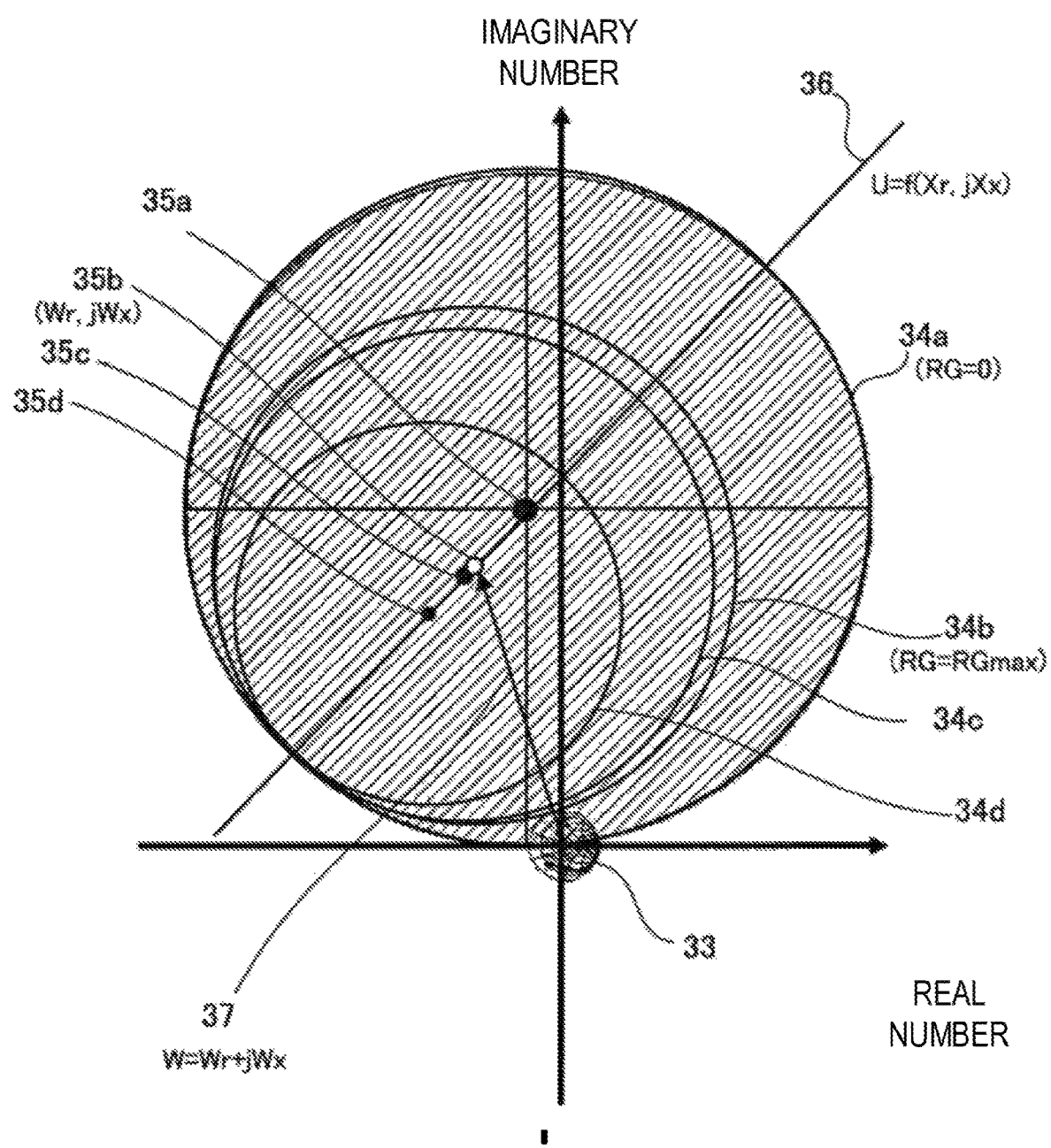
FIG. 7 is a view for explaining an example of a method of determining impedance of a matching circuit.

FIG. 7 is a view for explaining an example of a method of determining the impedance of the matching circuit.

FIG. 7 illustrates examples of a Smith chart 33 and output stable circles 34a, 34b, 34c, and 34d represented on a complex plane. The horizontal axis represents a real number, and the vertical axis represents an imaginary number.

The output stable circle 34a is an output stable circle when RG=0, and the output stable circle 34b is an output stable circle when RG=RGmax. The output stable circles 34c and 34d are output stable circles when RG>RGmax.

The radius of each of the output stable circles 34a to 34d decreases as the resistance value RG increases (as the PM storage amount increases). As the resistance value RG increases, the coordinates of the center points 35a, 35b, 35c, and 35d of the output stable circles 34a to 34d move on a straight line 36 such that the real value and the imaginary value become smaller. The coordinates on the straight line 36 may be represented by U=f(Xr, jXx). The "Xr" represents a real value, and the "jXx" represents an imaginary value.

The impedance of the matching circuit 11b is determined assuming that the worst case is RG=RGmax where the output stable circle is the output stable circle 34b in contact with the outer circumference of the Smith chart 33 (the absolute value of the output reflection coefficient r becomes 1 on the outer circumference).

When the center coordinate of the output stable circle 34b is (Wr, jWx), a vector 37 from the origin of the complex plane to the center coordinate of the output stable circle 34b may be expressed as W=Wr+jWx. At this time, by setting the impedance at which r becomes 1/W on the Smith chart 33, the output power of the negative resistance element 11a may be maximized in the matching circuit 11b.

Further, the impedance of the matching circuit 11b may be determined based on the resistance value RG that is determined from the PM accumulation amount when a difference between the inlet pressure of the exhaust gas and the outlet pressure of the exhaust gas in the housing 15 due to the PM accumulation in the DPF 15a is a limit value at which a vehicle can travel safely. For example, the impedance of the matching circuit 11b may be determined based on a vector from the origin of the complex plane to the center coordinate of an output stable circle when the PM accumulation amount is about 80% of the PM accumulation amount when the pressure difference is the limit value.

Hereinafter, an example of the overall operation of the filter processing device 20 will be described.

When a power supply voltage is supplied to the negative resistance element 11a by the power supplies VDD and VGG as illustrated in FIG. 3, the negative resistance element 11a oscillates as described above. Since the plural resonance frequencies exist in the housing 15 as illustrated in FIG. 1B, the filter 11c narrows the frequency band of the signal supplied to the antenna 15c to a band including any one of the resonance frequencies. Then, the signal is repeatedly reflected between the input terminal of the negative resistance element 11a and the antenna 15b, and due to the resonance phenomenon, the oscillation frequency of the negative resistance element 11a becomes equal to the resonance frequency of the housing 15 within the band narrowed by the filter 11c. When the PM or ash is adhered to the DPF 15a so that the resonance frequency is changed, the oscillation frequency of the negative resistance element 11a also follows the change.

Further, the detection circuit 11d receives a signal amplified in the amplification circuit 21b based on the radio wave received by the antenna 15d, and outputs a voltage value corresponding to the signal strength of the radio wave.

Meanwhile, when the SCU 22e instructs the timing control circuit 22d to start the measurement of the PM accumulation amount, the timing control circuit 22d outputs a trigger signal for instructing the start of the operations of the frequency measurement circuit 22a, the voltmeter 22b, and the data collection circuit 22c.

As a result, the frequency measurement circuit 22a starts measuring the frequency of the output signal of the negative resistance element 11a, and the voltmeter 22b starts measuring the voltage value of the output signal of the detection circuit 11d. In addition, the data collection circuit 22c collects the measurement results of the frequency measurement circuit 22a and the voltmeter 22b.

When the SCU 22e instructs the timing control circuit 22d to end the measurement of the PM accumulation amount, the timing control circuit 22d outputs a trigger signal for instructing the end of the operations of the frequency measurement circuit 22a, the voltmeter 22b, and the data collection circuit 22c.

As a result, the frequency measurement circuit 22a ends measuring the frequency of the output signal of the negative resistance element 11a, and the voltmeter 22b ends measuring the voltage value of the output signal of the detection circuit 11d. In addition, the data collection circuit 22c ends collecting the measurement results of the frequency measurement circuit 22a and the voltmeter 22b. The SCU 22e acquires the measurement results collected by the data collection circuit 22c and transmits the collected measurement results to the ECU 16.

For example, the ECU 16 calculates the PM accumulation amount from the collected measurement results and displays the calculated PM accumulation amount on the display 17. In addition, the ECU 16 may calculate the accumulation amount of ash based on a change in the frequency of the output signal of the negative resistance element 11a. Further, the ECU 16 may display the collected measurement results as they are on the display 17.

Further, when the PM accumulation amount reaches the upper limit value, the ECU 16 increases the temperature of the exhaust gas generated by burning the diesel oil by controlling an engine (not illustrated), in order to burn the PM. During the process of burning the PM, the signal processing circuit 22 is able to measure the frequency of the output signal of the negative resistance element 11a and measure the voltage value of the output signal of the detection circuit 11d, so that the effect of the burning may be confirmed. In addition, the PM may be burned with a microwave. An example of burning the PM with a microwave will be described later.

According to the PM detection circuit 21 and the filter processing device 20 of the second embodiment as described above, the same effects as those of the PM detection circuit 11 and the filter processing device 10 of the first embodiment may be obtained. That is, the time for measuring the PM accumulation amount may be reduced. Further, the change in the accumulation amount of adhered matter may be sequentially monitored in real time.

Third Embodiment

Figure 8:
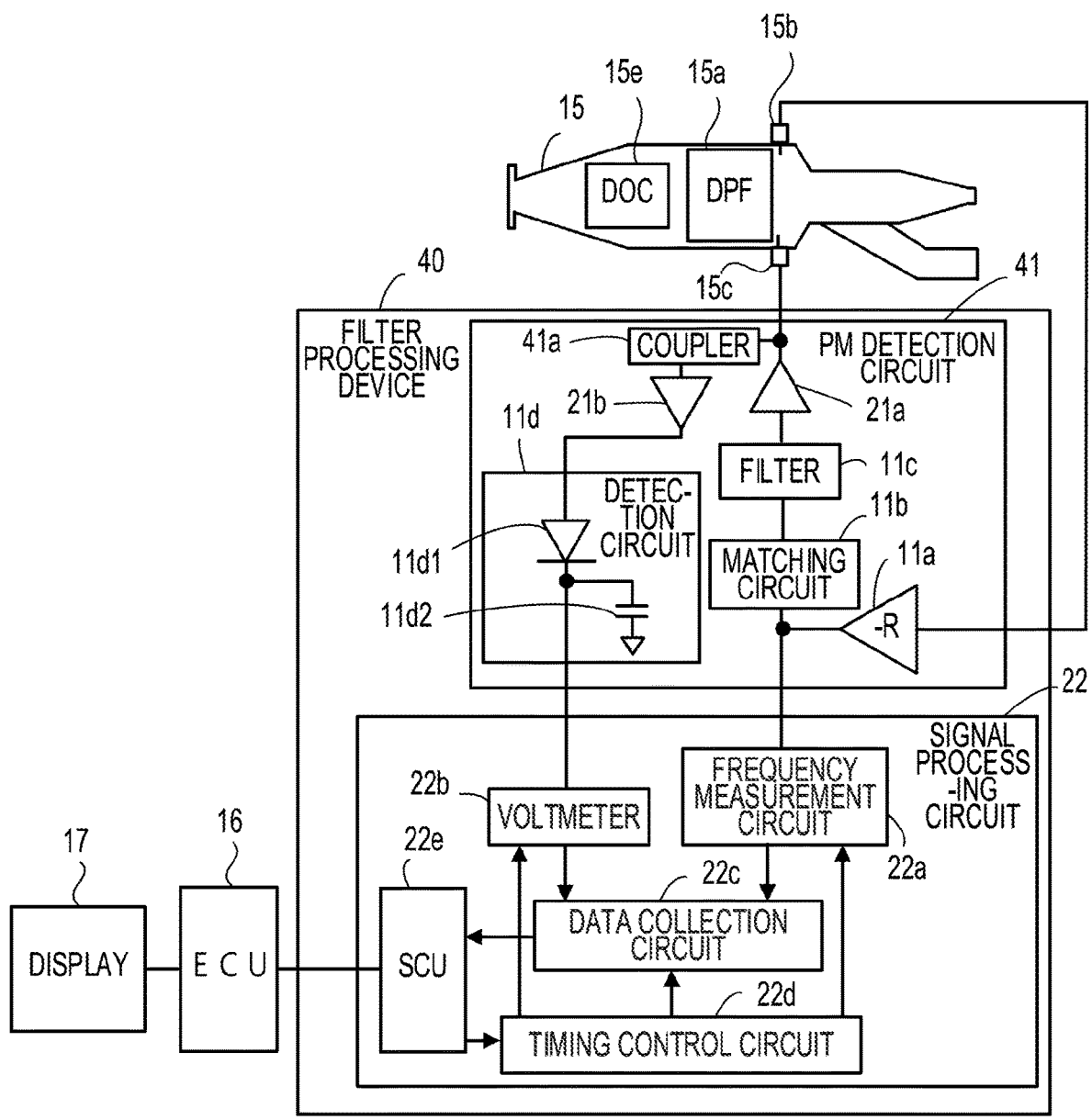
FIG. 8 is a view illustrating an example of a PM detection circuit and a filter processing device according to a third embodiment.

FIG. 8 is a view illustrating an example of a PM detection circuit and a filter processing device according to a third embodiment. In FIG. 8, the same components as those illustrated in FIG. 2 will be denoted by the same reference numerals as used in FIG. 2.

A PM detection circuit 41 in a filter processing device 40 includes a coupler (also referred to as a directional coupler) 41a.

The coupler 41a supplies a signal based on a radio wave received by the antenna 15c to the amplification circuit 21b (radio wave transmitted by the antenna 15c itself and reflected).

As a result, the same effects as the PM detection circuit 21 of the second embodiment may be obtained, and the antenna 15d becomes unnecessary.

A duplexer may be used instead of the coupler 41a.

Fourth Embodiment

Figure 9:
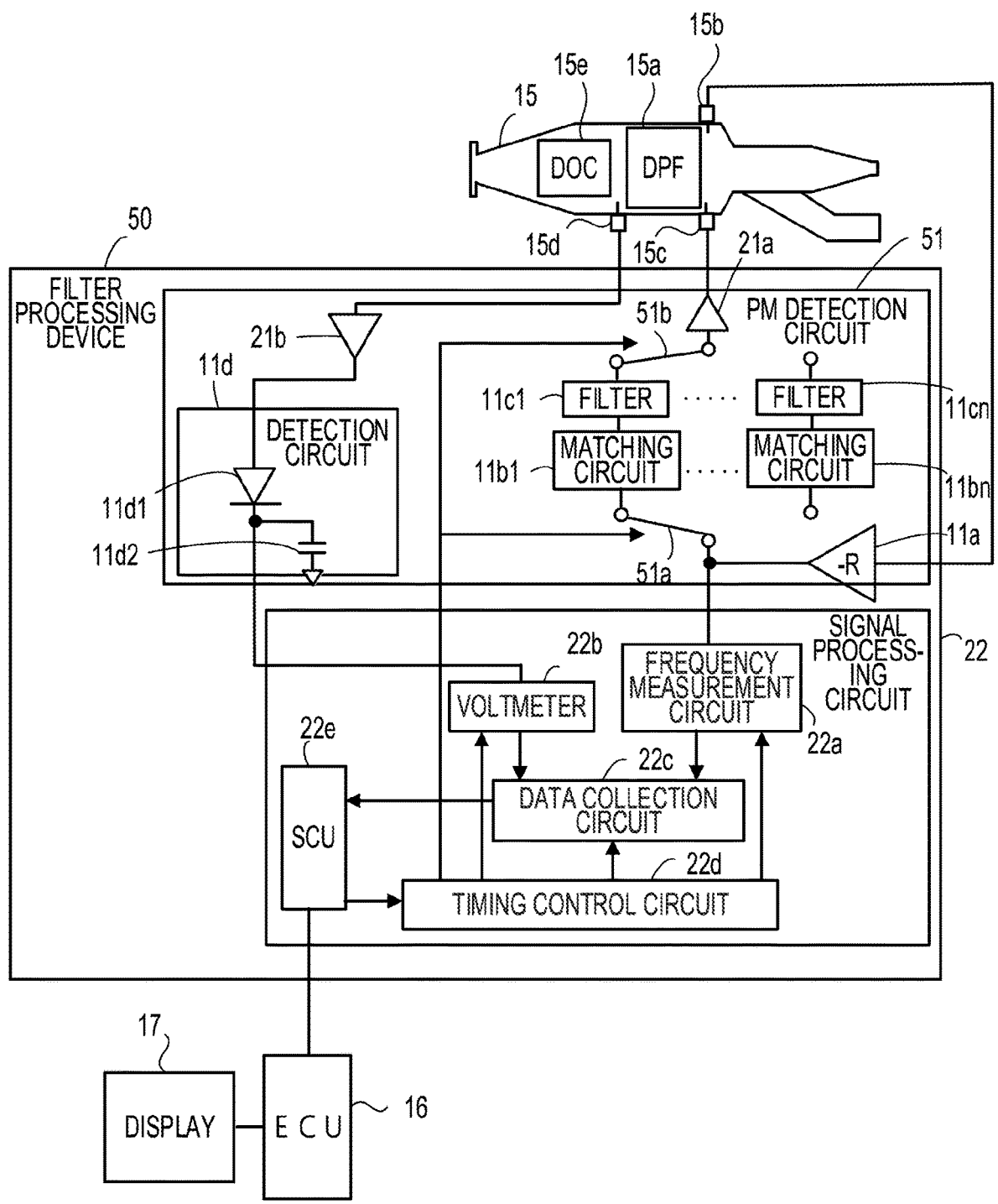
FIG. 9 is a view illustrating an example of a PM detection circuit and a filter processing device according to a fourth embodiment.

FIG. 9 is a view illustrating an example of a PM detection circuit and a filter processing device according to a fourth embodiment. In FIG. 9, the same components as those illustrated in FIG. 2 will be denoted by the same reference numerals as used in FIG. 2.

A PM detection circuit 51 in a filter processing device 50 includes plural matching circuits 11b1 to 11bn, plural filters 11c1 to 11cn, and switches 51a and 51b.

Each of the matching circuits 11b1 to 11bn and each of the filters 11c1 to 11cn narrow the frequency band of a signal passing through a band including any one of the plural resonance frequencies of the housing 15 as illustrated in FIGS. 1A and 1B. A matching circuit and a filter to be used are selected by the switches 51a and 51b according to the change in one of the plural resonance frequencies that the oscillation frequency of the negative resistance element 11a follows.

For example, when the PM accumulation amount is measured from the change in the signal strength when the resonance frequency f1a changes as illustrated in FIG. 1B, the matching circuit 11b1 and the filter 11c1 are coupled by the switches 51a and 51b between the output terminal of the negative resistance element 11a and the input terminal of the amplification circuit 21a.

A switching between the switches 51a and 51b is performed by the timing control circuit 22d, for example, under the control of the SCU 22e. Further, the SCU 22e itself may switch the switches 51a and 51b.

A plurality of matching circuits 11b1 to 11bn are provided because the matching conditions capable of maximizing the output voltage of the negative resistance element 11a differ from each other depending on the oscillation frequency of the negative resistance element 11a. The matching circuits 11b1 to 11bn each set with an appropriate impedance are used according to the oscillation frequency by the method as illustrated in FIG. 7.

According to the PM detection circuit 51 described above, the same effects as those of the PM detection circuit 21 of the second embodiment may be obtained, and further, the oscillation frequency of the negative resistance element 11a may be caused to follow each of the plural resonance frequencies. Therefore, a frequency band suitable for the monitoring may be selected, so that the measurement accuracy of the PM accumulation amount may be improved. For example, the signal processing circuit 22 selects a frequency band including a resonance frequency at which a change in signal strength of a radio wave detected by the detection circuit 11d is relatively large (a change in PM accumulation amount appears more remarkably).

In addition, the signal processing circuit 22 may change a frequency band selected every certain time. In that case, the ECU 16 may display on the display 17 the measurement results for each frequency band supplied from the signal processing circuit 22 in time series. Thus, a change in resonance state due to the adhesion of PM or ash may be confirmed in real time.

Further, the filter processing device 50 may measure the PM accumulation amount based on the respective changes in the plural resonance frequencies and may determine the PM accumulation amount that is considered as a relatively accurate measurement result, based on the distribution of the measurement results.

Fifth Embodiment

Figure 10:
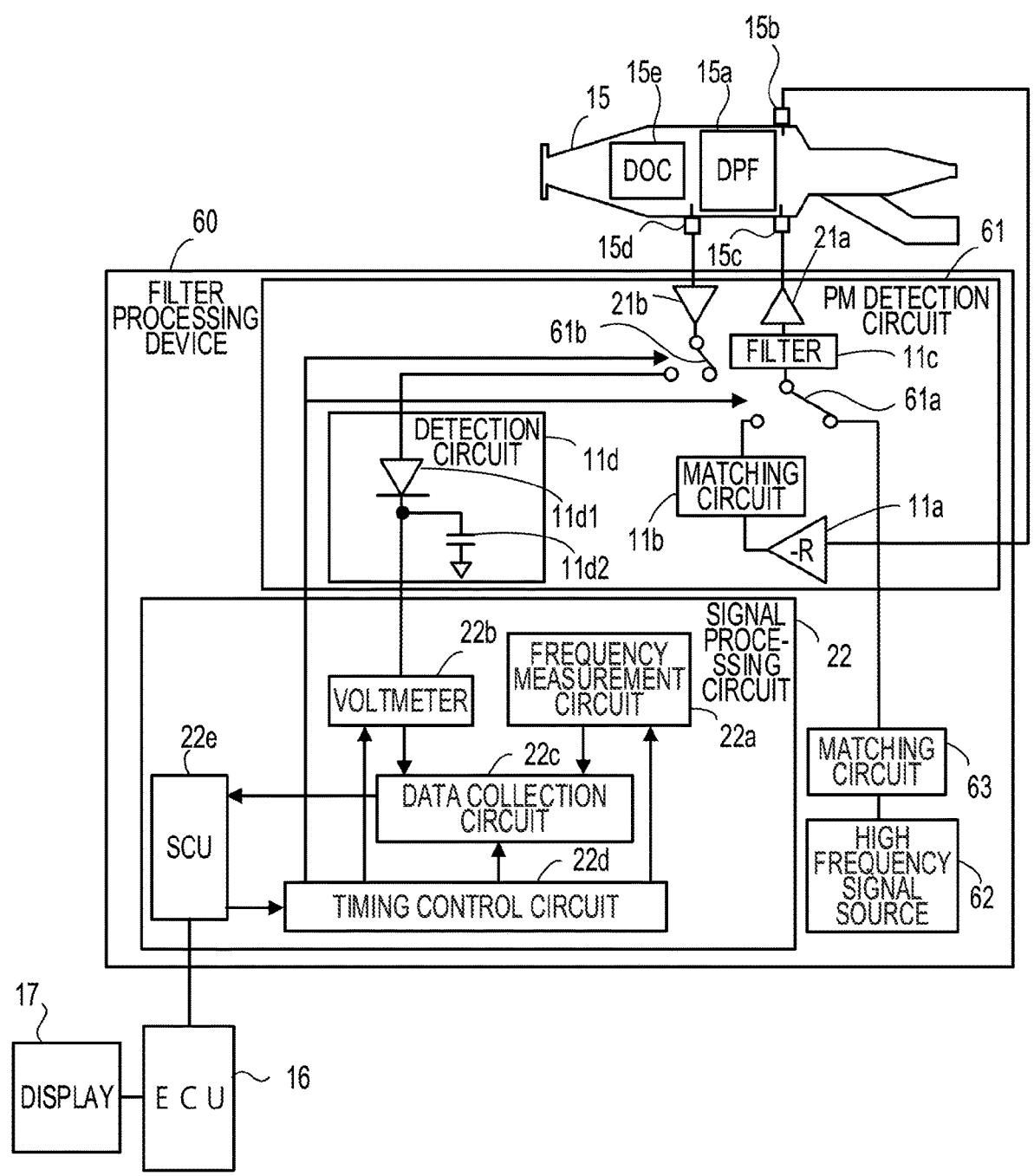
FIG. 10 is a view illustrating an example of a PM detection circuit and a filter processing device according to a fifth embodiment.

FIG. 10 is a view illustrating an example of a PM detection circuit and a filter processing device according to a fifth embodiment. In FIG. 10, the same components as those illustrated in FIG. 2 will be denoted by the same reference numerals as used in FIG. 2.

When the PM is burned by a microwave, there is a possibility that a radio wave for measuring the PM accumulation amount propagating into the housing 15 is affected by the microwave. Therefore, when the PM is burned by the microwave, it is desirable to stop the measurement of PM accumulation amount.

As illustrated in FIG. 10, a PM detection circuit 61 in a filter processing device 60 includes switches 61a and 61b. Further, the filter processing device 60 includes a high frequency signal source 62 for outputting a high frequency signal in the microwave band, and a matching circuit 63 for maximizing the output power of the high frequency signal source 62. The high frequency signal source 62 is, for example, an amplification circuit using gallium nitride (GaN).

The switch 61a switches between transmitting the output signal of the negative resistance element 11a to the antenna 15c and transmitting the high frequency signal from the high frequency signal source 62 to the antenna 15c.

The switch 61b switches between connection and disconnection between the antenna 15d and the detection circuit 11d.

When the PM is burned by the microwave, the switch 61a cuts off the connection between the matching circuit 11b and the filter 11c, and connects the filter 11c and the matching circuit 63 to each other. As a result, the high frequency signal output from the high frequency signal source 62 propagates to the antenna 15c.

When the PM is burned by the microwave, the switch 61b cuts off the connection between the antenna 15d and the detection circuit 11d.

A switching between the switches 61a and 61b is performed by the timing control circuit 22d, for example, under the control of the SCU 22e. Further, the SCU 22e itself may switch between the switches 61a and 61b.

The switch 61a may be interposed between the filter 11c and the amplification circuit 21a.

In the filter processing device 60 described above, the PM burning by the microwave and the measurement of the PM accumulation amount may be performed at different timings, and thus, the radio wave for the measurement of the PM accumulation amount may be suppressed from being affected by the microwave for the PM burning.

The filter processing devices 40, 50, and 60 according to the third to fifth embodiments may be combined with each other. For example, when the filter processing devices 50 and 60 are combined with each other, a switch corresponding to the switch 61a of the PM detection circuit 61 as illustrated in FIG. 10 may be interposed between the switch 51b of the PM detection circuit 51 of the filter processing device 50 and the input terminal of the amplification circuit 21a. Then, the switch may be used to switch between transmitting the output signal of the negative resistance element 11a to the antenna 15c and transmitting a high frequency signal of the microwave band to the antenna 15c.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A particulate matter detection circuit comprising:
a negative resistance circuit configured to:
couple to a first antenna arranged in a housing accommodating a first filter that filters an exhaust gas,
couple to a second antenna arranged in the housing via a matching circuit that performs an impedance matching and a second filter that narrows the frequency band of a passing signal, and
oscillate at a resonance frequency of the housing, the resonance frequency of the housing varying depending on an amount of matter adhered to the first filter; and
a detection circuit configured to output a voltage value corresponding to a signal strength of a radio wave received by a third antenna or the second antenna inserted in the housing.

2. The particulate matter detection circuit according to claim 1, wherein
the second filter cuts off signals in a band other than a band including one of a plurality of resonance frequencies of the housing.

3. The particulate matter detection circuit according to claim 2, further comprising:
a plurality of third filters, each of the plurality of third filters narrows the frequency band to a first band including any one of the plurality of resonance frequencies;
a plurality of matching circuits; and
a switch coupled between an output terminal of the negative resistance circuit and the second antenna, and configured to select one of the plurality of third filters and one of the plurality of matching circuits as the second filter and the matching circuit.

4. A filter processing device comprising:
a particulate matter detection circuit including a negative resistance circuit and a detection circuit; and
a signal processing circuit,
wherein the negative resistance circuit is configured to:

couple to a first antenna arranged in a housing accommodating a first filter that filters an exhaust gas, couple to a second antenna arranged in the housing via a matching circuit that performs an impedance matching and a second filter that narrows the frequency band of a passing signal, and oscillate at a resonance frequency of the housing, the resonance frequency of the housing varying depending on an amount of matter adhered to the first filter, wherein the detection circuit is configured to output a voltage value corresponding to a signal strength of a radio wave received by a third antenna or the second antenna inserted in the housing, and wherein the signal processing circuit is configured to measure the voltage value and the frequency of an output signal of the negative resistance circuit and output results of the measurement.

5. The filter processing device according to claim 4, wherein the second filter cuts off signals in a band other than a band including one of a plurality of resonance frequencies of the housing.

6. The filter processing device according to claim 5, further comprising:

a plurality of third filters, each of the plurality of third filters configured to narrow the frequency band to a first band including any one of the plurality of resonance frequencies;

a plurality of matching circuits; and a switch configured to:

couple between an output terminal of the negative resistance circuit and the second antenna, select one of the plurality of third filters and one of the plurality of matching circuits as the second filter and the matching circuit.

7. The filter processing device according to claim 4, wherein the particulate matter detection circuit includes:

a first switch that switches between transmitting the output signal of the negative resistance circuit to the second antenna and transmitting a microwave band high frequency signal output by a signal source to the second antenna; and a second switch that switches between connection and disconnection between the third antenna or the second antenna and the detection circuit, and wherein the signal processing circuit controls the first switch to transmit the high frequency signal to the second antenna and controls the second switch to cut off the connection between the third antenna or the second antenna and the detection circuit when the particulate matter is burned by a microwave.

* * * * *